May 8, 1956  D. R. LAMBERT ET AL  2,744,685
COUNTERS
Filed Nov. 17, 1954  3 Sheets-Sheet 1
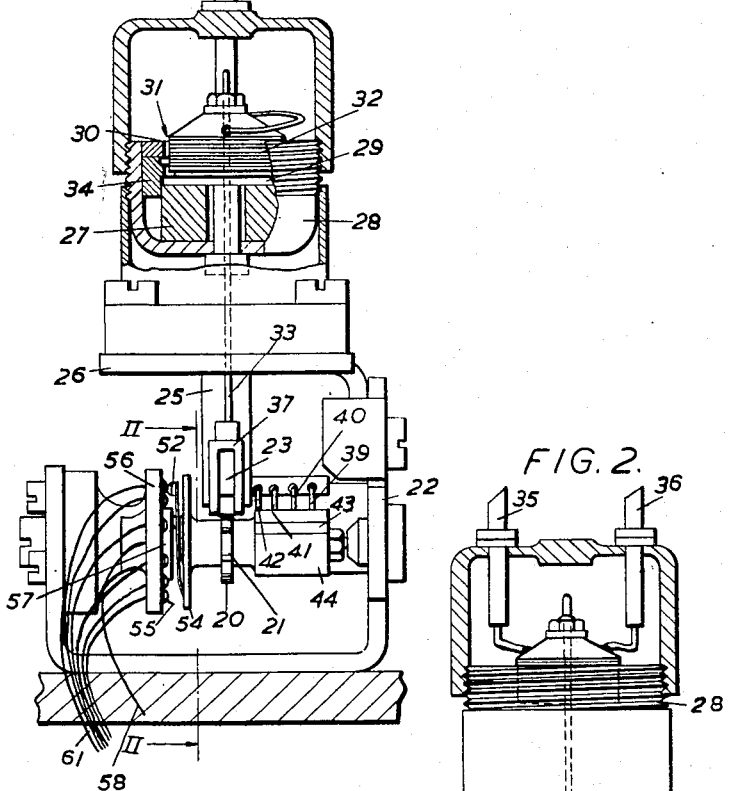
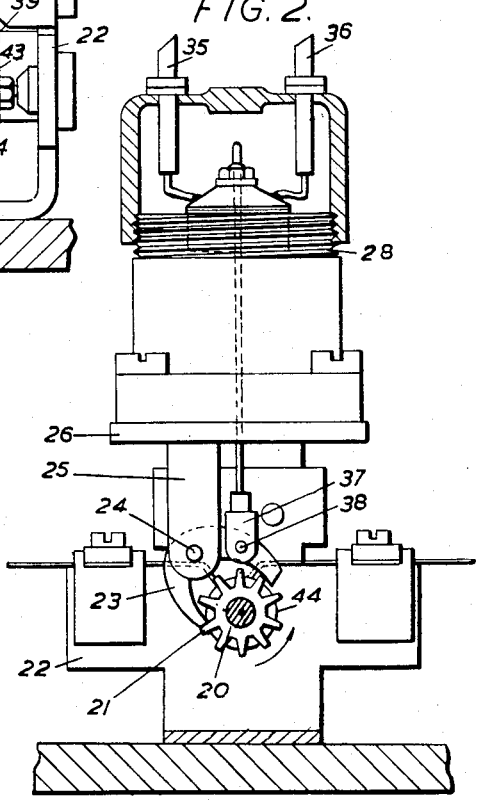
Inventor
DONALD R. LAMBERT & CHARLES T. A. JONES Inventor
DONALD R. LAMBERT & CHARLES T. A. JONES May 8, 1956  D. R. LAMBERT ET AL  2,744,685
COUNTERS Filed Nov. 17, 1954  3 Sheets-Sheet 3

Inventor
DONALD R. LAMBERT & CHARLES T. A. JONES 2,744,685
Patented May 8, 1956

2,744,685

COUNTERS

Donald Rudolf Lambert, Carshalton, and Charles Thomas Arthur Jones, Wallington, England, assignors to Powers-Samas Accounting Machines Limited, London, England, a British company Application November 17, 1954, Serial No. 469,518

Claims priority, application Great Britain December 7, 1953

4 Claims. (Cl. 235—92)

This invention relates to counters and in particular to encounters for use in record card or similarly controlled statistical machines.

According to the present invention a counter comprises actuating means operable by the application thereto of alternating electric current, a toothed wheel supported for angular movement about the axis thereof, and an escapement connected with the actuating means for operation thereby and co-operating with the toothed wheel to effect angular movement thereof by a single tooth increment for each cycle of alternating current applied to the actuating means.

Figure 3:
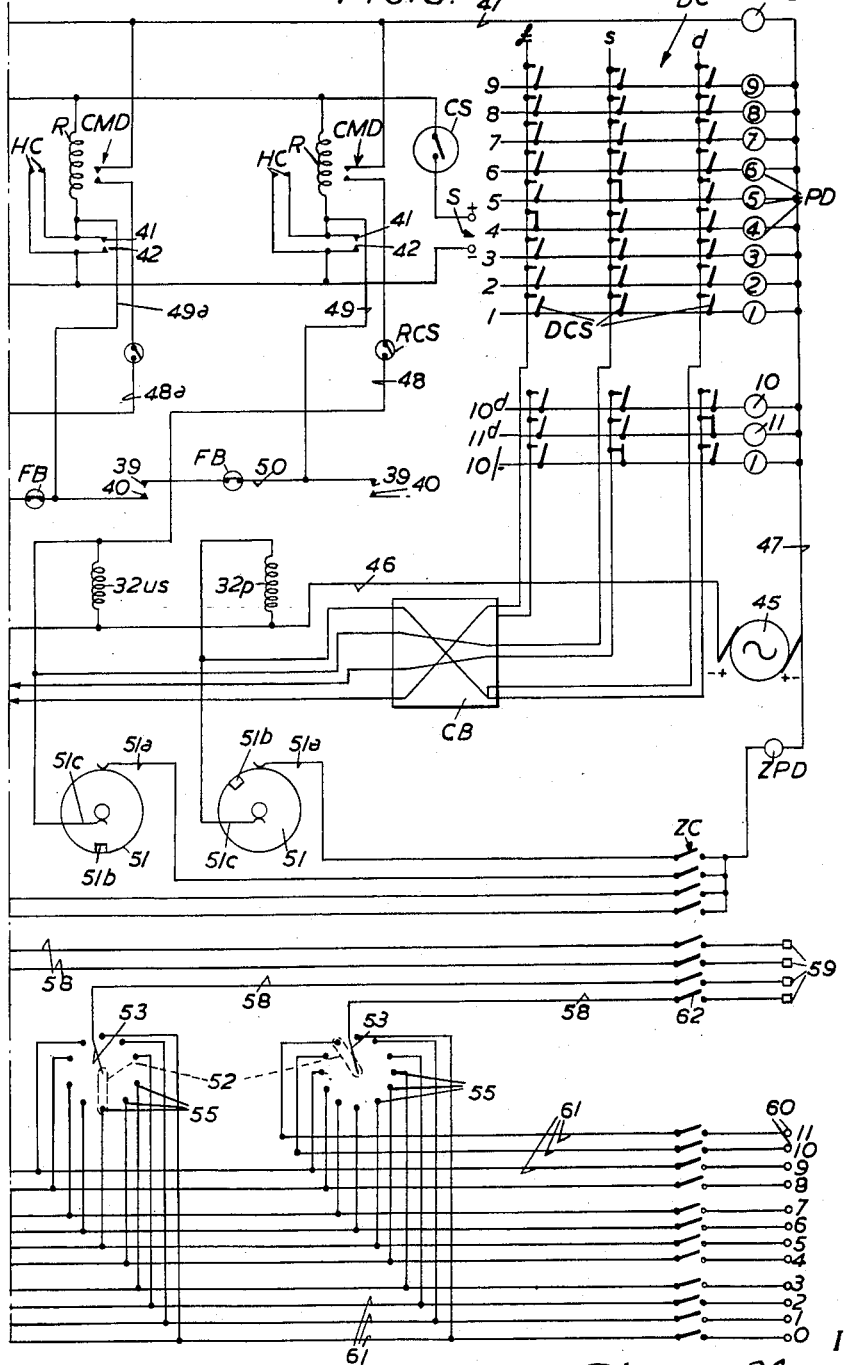
Figure 4:
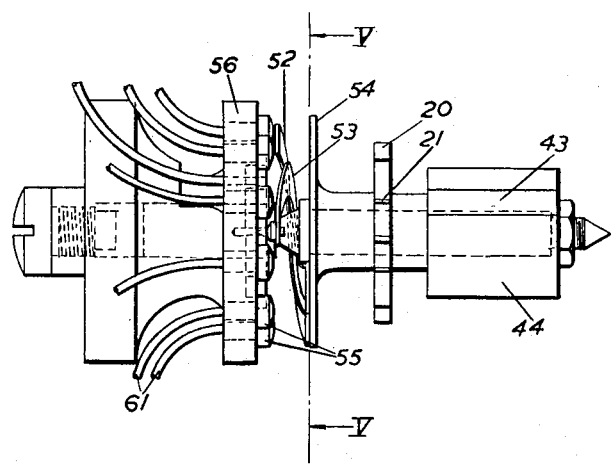
Figure 5:
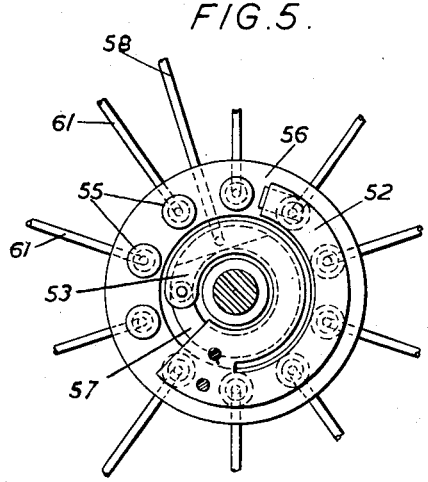

In order that the invention may be clearly understood one embodiment thereof will now be described, by way of example, with reference to the accompanying diagrammatic drawings, in which:

Fig. 1 is an elevation, partly in section, of a counter according to the invention, Fig. 2 is an end view of Fig. 1, partly in section on line II, II, Fig. 1, Fig. 3 is a circuit diagram illustrating the manner of co-operation of two counters for registering numbers of different denominations, Fig. 4 is a view, to an enlarged scale, of a part of Fig. 1, and Fig. 5 is a section on line V—V, Fig. 4.

Referring to the drawings, Figs. 1 and 2 illustrate a counter in which a toothed wheel 20 is supported for angular movement about its axis and is arranged to be moved angularly by single tooth increments each tooth representing a unit. In Fig. 2 the toothed wheel 20 is provided with ten teeth 21 representative of the numbers 0 to 9 but it will be understood that, if desired, a wheel 20 may have twelve teeth representative of numbers 0 to 11, or it may have a plurality of teeth which is a multiple of a given number, for example if the wheel is to be employed for counting tens-of-shillings it will be provided with teeth the number of which is a multiple of two of which the teeth alternately represent 0 to 1. It will be understood that in all instances a wheel will be provided with carry initiating means as appropriate thereto.

The toothed wheel 20 is supported for angular movement about its axis by bearings carried by a bracket 22 and angular movement of the wheel 20 is effected by an escapement formed by a U-shaped element 23 supported for rocking movement about a pivot 24, Fig. 2, located near the centre of the base of the U-shaped element and carried by a yoke 25 extending from a wing portion 26 of the bracket 22. The free ends of the limbs of the U-shaped element 23 are so disposed in relation to the teeth of the toothed wheel 20 that on rocking of the element 23 about its pivot 24 the limbs co-operate alternately with the toothed wheel to effect each single-toothed incremental movement of the wheel 20 about its axis.

Operation of the escapement is effected by actuating means comprising a permanent magnet 27, Fig. 1, housed in a soft-iron case 28 carried by the wing portion 26 of bracket 22, a soft-iron inner pole-piece 29, a soft-iron washer-like outer pole-piece 30 the bore of which forms an air-space 31, a coil-wound former 32 supported by the inner pole-piece for axial movement in the air-space 31 and a reciprocable connecting element in the form of a wire 33 connecting the former 32 with the escapement 23.

The magnet 27 and inner pole-piece 29 are located in the case 28 by a non-conducting ring 34 which also spaces the pole-pieces 29, 30 apart lengthwise of the case 28. The coil of former 32 is connected with a pair of terminals 35, 36, Fig. 2, arranged for connection in an electric circuit to which can be applied an alternating electric current, see Fig. 3, each cycle of which is representative of a unit to be registered in the counter.

The wire 33 is connected with the escapement 23 through a yoke-piece 37 which at 38, Fig. 2, is pivoted to the escapement between the pivot 24 therefore and the free-end of one of the limbs of the U-shaped element.

In operation, when the terminal 35 is positive with respect to terminal 36 the coil-wound former 32 is urged downwards, as viewed in Fig. 2, and when terminal 35 is negative with respect to terminal 36, the former 32 is urged upwards. Thus, through wire 33, the escapement 23 is rocked about pivot 24 first in a clockwise direction, as viewed in Fig. 2, so that the limb thereof to which the wire is connected is engaged with the wheel 20 to move it angularly by an increment of one-half of one tooth in a clockwise direction, as viewed in Fig. 2, and then in a counterclockwise direction so that the other limb of the escapement is restored to co-operating relation with the wheel and causes the wheel to move one-half of one tooth, thus completing an angular movement of one tooth.

It will be understood that although there has been described above a single counter there will usually be employed a plurality of such counter units each of which registers numbers according to a predetermined denomination such, for example, as units, tens, hundreds and so on, or pence, units of shillings, tens-of-shillings, units of pounds, and so on, and that when so arranged provision must be made whereby a carry from a counter of lower denomination can be effected to the counter of next higher denomination. To this end the counter is provided with a first pair of electrical brushes 39, 40, Figs. 1 and 3, and a second pair of brushes 41, 42 which are connectable in a carry circuit, Fig. 3, from the counter of lower denomination to the counter of next higher denomination, and with a conductor strip 43, Fig. 1, carried by an insulating member 44 integral with or secured to the wheel 20 for angular movement therewith. The pairs of brushes are so arranged that the conductor strip 43 bridges the brushes 39, 40 when the wheel 20 is in the standing-on-maximum position thereof, that is, for a decimal counter, when the wheel registers 9, and the former 32 is in the normally inactive position thereof, and it is arranged to bridge the brushes 41, 42 when the toothed wheel 20 is passing from the standing-on-maximum position thereof to the zero registering position thereof, that is the wire 33 has been moved thereby to the full extent of disc CPD and which opens after the application of a carry pulse and is again closed before the commencement of the next addition cycle. A rotary carry switch RCS is also rotated in timed relation with the carry pulse disc CPD and is closed during a carry pulse.

If during the registration of a number in the counter 32p the toothed wheel 20 thereof should pass from the 11 to the 0 position thereof the brushes 41, 42 will be engaged by the strip 43 for that counter thereby causing operation of the carry memory relay R and closing contacts CMD and hold on contacts HC. Thus on closing of switches RCS a carry pulse from line 47 will be applied to the counter 32us along line 48.

If during an addition period when numbers are being registered the carry memory relay R for counter 32p is energised current will flow along line 49 to line 50 which is connected with the standing-on-maximum brushes 39, 40 for counter 32us. Thus if during the addition period the brushes 39, 40 for counter 32us are engaged by their strip 43 current from line 49 will pass along line 49a to energise the carry memory relay R for the counter 32us so that on closing of the switches CS, RCS a carry pulse is applied along line 48a to the counter, not shown, for registering tens-of-shillings, that is the counter of next higher denomination after the units-of-shillings counter. Rotary switches FB, which are open during a carry pulse are included in the line 50 to prevent a feedback to the counters of lower denomination.

Rotatable electrically conductive zeroising wheels 51 and a rotatable zeroising pulse disc ZPD are provided downward movement thereof.

Fig. 3 illustrates the manner in which a carry is effected from a counter of one denomination to a counter of next higher denomination and shows two denominations of which one consists of a counter for registering pence and the other is a counter for registering units of shillings. Referring to Fig. 3, the two coil-wound formers 32p (pence) and 32us (units-of-shillings) are connected with an alternator 45 through a common line 46, through line 47, a decoding device DC, connection box CB and lines 48, 49. The decoder DC and connection box CB form no part of the present invention but are the devices which respectively determine a number to be registered and the counter by which registration is to be effected. The decoder, however, incorporates switches DCS selection of which can be effected by a keyboard or by record card or other suitable controlling devices and the switches DCS are electrically connected with continuously rotatable pulse discs PD which, on closing of a selected switch DCS permits a predetermined number of discrete alternating current pulses to be applied to a counter. Also included in line 47 is a carry pulse disc CPD which is operative to apply a carry pulse to each counter after all the pulse discs PD have completed the operative portions of each rotation thereof.

The carry pulse is applicable to a counter through contacts CMD of a carry memory relay R included in a circuit connected to a source S of direct current, this circuit being controlled by a rotary cut-off switch CS which is rotated in timed relation with the carry pulse in the circuit for the purpose of zeroising the counters, the wheels 51 being called in for operation, when required, by any suitable means, for example under control of a perforation formed in a record card. The zeroising wheel 51 for each counter is provided with a brush 51a in constant contact with the periphery of the wheel 51 which has a non-conducting insert 51b set therein, and with a brush 51c making continuous contact with the wheel. On initiation of a zeroising operation the normally open contacts ZC are closed to connect the wheels 51 with the actuating coils 32, through the brushes 51a, 51c, and the zeroising pulse disc ZPD. The counter units will then operate until the brushes 51a engage the non-conducting inserts 51b which are so positioned that the units are then in the zero registering positions thereof.

Each counter is provided with read-out means which comprises a first read-out brush 52, Figs. 3, 4, and 5, and a second read-out brush 53 carried by a disc 54 integral with the insulating member 44 and the brushes being connected electrically one with the other and the first brush 52 arranged successively to co-operate with each of a plurality of electrical contacts 55, one for each tooth of the wheel 20, supported by a fixed contact-supporting member 56. The member 56 is of insulating material and is supported by the bracket 22 and the contacts 55 are disposed to be equi-distantly spaced apart about an axis co-axial with the wheel 20. The brush 53 makes continuous electrical contact with a slip ring 57, Figs. 4 and 5, carried by the member 56.

The read-out means are connected with a recording control device one form of which, although forming no part of the present invention, is indicated in Fig. 3. As shown in Fig. 3 the second brush 53 is connected by a line 58 to a moving coil 59 which, under control of rotatable character-defining discs 60, causes lengthwise movements of a stylus, not shown, thereby to cause definition of a character representative of a number read-out from the counter. As can be seen from Fig. 3 each disc 60 is connected by a line 61 with each of the contacts 55 representative of like value in each of the counters. The lines 58 include switches 62 which latter are closed by cams, not shown, to initiate a reading-out operation from the counters.

We claim:

1. A counter comprising a toothed wheel supported for angular movement about the axis thereof, a permanent magnet, a coil-wound former for connection with a source of alternating current and movable in the airspace of the magnet, an escapement co-operating with the toothed wheel to effect angular movement thereof by a single tooth increment for each cycle of alternating current applied to the former, a reciprocable connecting element connecting the former with the escapement to effect operation thereof, a first pair and a second pair of electrical brushes connectable in a carry circuit from the counter to a counter of next higher denomination, an insulating member movable angularly with the toothed wheel, and a conductor strip carried by the insulating member to bridge said first pair of brushes when the toothed wheel is in the standing-on-maximum position thereof and the former is in the normally inactive condition thereof, and to bridge the second pair of brushes when the toothed wheel is passing from the standing-on-maximum to the zero position thereof and the former is in the fully active position thereof.

2. A counter according to claim 1, including a fixed contact-supporting member, an electrical contact for each tooth of the toothed wheel, said contacts being supported by the contact-supporting member and equi-spaced about an axis co-axial with the toothed wheel for connection with a recording control device, a slip ring carried by the contact-supporting member for electrical connection with a recording device, and a first and a second read-out brush movable with the toothed wheel, said first read-out brush being electrically connected with the second read-out brush and co-operable successively with said contacts, and the second read-out brush making continuous engagement with the slip-ring.

3. A counter according to claim 2, including a rotatable electrically conductive zeroising wheel in circuit with said former, an electrically non-conductive insert carried by the zeroising wheel at a position corresponding to the position of zero register of the toothed wheel, a zeroising pulse disc operatively connected to the former to apply alternating current thereto, a first brush connecting the zeroising pulse disc with the portion of the zeroising wheel which carries said insert, a second brush connecting the former to the zeroising wheel to be in continuous electrical engagement with the wheel, and normally open contacts in circuit with the zeroising pulse disc and said first brush and arranged to be closed to initiate a zeroising operation.

4. A counter according to claim 1, wherein the escapement comprises a U-shaped element supported for rocking movement about a pivot in the base of the U-shaped element, said connecting element being connected to one limb of the U-shaped element between the pivot and the free end of the limb, and the limbs of the U-shaped element being so disposed in relation to the teeth of the toothed wheel that the free ends of the limbs co-operate alternately with the toothed wheel to effect each single tooth incremental movement thereof.

References Cited in the file of this patent

UNITED STATES PATENTS 1,675,919　　Babcock _____ July 3, 1928